UNITED STATES PATENT OFFICE.

HUGO SCHWEITZER, OF NEW YORK, AND EMIL E. LUNGWITZ, OF BROOKLYN, NEW YORK, ASSIGNORS TO THEMSELVES, AND EDWARD N. DICKERSON AND THOMAS L. WILLSON, OF NEW YORK, N. Y.

PRODUCTION OF STEEL AND REFINING OF IRON ORE.

SPECIFICATION forming part of Letters Patent No. 566,026, dated August 18, 1896.

Application filed August 10, 1894. Serial No. 519,967. (No specimens.)

*To all whom it may concern:*

Be it known that we, HUGO SCHWEITZER, of the city and county of New York, and EMIL E. LUNGWITZ, of the city of Brooklyn, county of Kings, State of New York, have invented a new and useful Improvement in the Production of Steel and the Refining of Iron Ore, of which the following is a full, true, and exact description.

In the manufacture of steel after the method introduced by Bessemer it has been essential to have at command iron ore of good quality, free from sulfur and phosphorus, because the sulfuric and phosphoric acid formed during the process, owing to the oxidation of sulfur and phosphorus, were reduced again by the melted iron at white heat.

The ore free from sulfur and phosphorus being considerably more expensive than iron ore, containing a larger percentage of sulfur and phosphorus, Thomas & Gilchrist introduced the use of lime in the Bessemer process. In this manner they effected the formation of lime-salts of sulfuric and phosphoric acid. These lime-salts could not be secondarily reduced by the iron, even at the highest temperatures, and were removed from the metal in the form of slags. Thus the Thomas & Gilchrist process permits the use of iron ore for the manufacture of steel, which contains larger amounts of sulfur and phosphorus. In the Thomas & Gilchrist process, however, the metal does not come in perfect contact with the lime, which is in different ways prevented from reacting on the formed acids. Again, it is a known fact that the Thomas & Gilchrist process works only satisfactorily with iron containing a quantity of phosphorus, not less than about from two to three per cent, this amount of phosphorus being necessary to produce a heat sufficiently high for keeping the mass liquid. On the other side, the Bessemer process works only with iron poor in phosphorus. Thus it is seen that there are a great variety of ores which cannot be utilized for the manufacture of iron which is to be converted into steel. Our process, however, permits the utilization of any kind of iron ore containing much or little phosphorus, that is, ore of any purity whatever, for the conversion of iron into steel.

We propose to convert iron into steel by using calcium carbid. In doing so we have the following advantages: first, thorough mixing of the calcium carbid and the iron; second, the formation of lime *in statu nascendi* from the calcium carbid; third, a very strong reaction between the lime *in statu nascendi* and the formed acids; fourth, a higher temperature in the converter, owing to the formation of lime from calcium carbid; fifth, carburization of steel by the carbon of the calcium carbid.

In carrying out our invention we introduce into the converter an excess over the quantity of calcium carbid either in pieces or in melted state which is necessary to furnish the lime for the combination with the sulfuric and phosphoric acid formed from sulfur and phosphorus, and proceed otherwise in the manner well known in the art of manufacturing steel.

The calcium carbid may be introduced into the converter at the beginning of the operation, although it is preferable to charge the converter with it some time after the blast has been started. All this depends on the chemical composition of the raw iron.

What we claim as our invention, and desire to secure by Letters Patent, is—

1. The step in the process of manufacturing steel from iron, which consists in treating the melted iron with carbid of calcium in a converter, substantially as described.

2. The method of treating molten iron or steel, which consists in bringing in contact therewith a carbid of an alkaline-earth metal, substantially as described.

In testimony whereof we have signed our names to this specification in the presence of two subscribing witnesses.

HUGO SCHWEITZER.
EMIL E. LUNGWITZ.

Witnesses:
H. COUTANT,
ANTHONY GREF.